March 28, 1967   K. L. HOTCHKISS ETAL   3,311,396
UNAUTHORIZED ACCESS INDICATING MEANS
Filed April 20, 1965
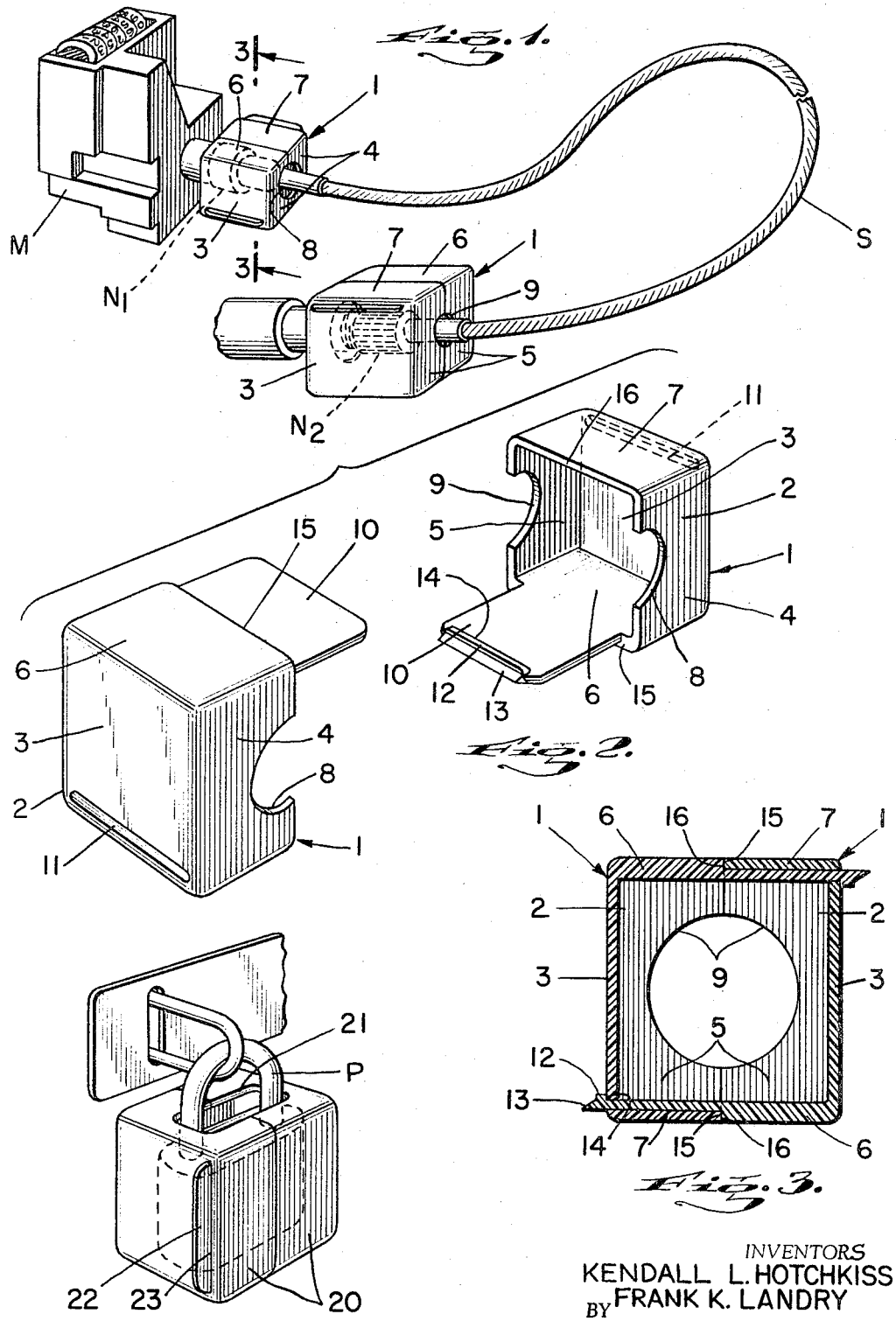
INVENTORS
KENDALL L. HOTCHKISS
FRANK K. LANDRY
BY
ATTORNEY

United States Patent Office 3,311,396
Patented Mar. 28, 1967

3,311,396
UNAUTHORIZED ACCESS INDICATING
MEANS
Kendall L. Hotchkiss, 23831 Hartland St., Canoga Park,
Calif. 91303, and Frank K. Landry, 20891 Kelvin
Place, Woodland Hills, Calif. 91364
Filed Apr. 20, 1965, Ser. No. 449,482
5 Claims. (Cl. 292—307)

This invention relates to means for indicating that an element of mechanism as, for example, a connection between certain mechanical parts, a lock, or other device has been subjected to tampering. Various types of seals and the like have heretofore been employed to give evidence of tampering activities and the present invention proposes the use of an enclosing means composed of at least two parts capable of snap-in assembly with each other but incapable of being separated without breakage of one or both parts with resultant impossibility of restoring the broken parts to cover up the tampering.

A problem in recent years has developed in the automobile and truck rental business in which, on occasion, the rented vehicle is returned after having been driven a considerable distance after which the renter has uncoupled the speedometer drive and turned the speedometer backward to reduce the indicated mileage and then recoupled the speedometer drive and paid the lessor for an amount of mileage less than that which has actually been used.

Another problem has always been to provide locks for rooms, lockers, and other enclosures with means for indicating that the lock has been tampered with while preserving the original integrity of the lock itself.

With these considerations in mind, it is an object of the present invention to provide a means which is capable of snap-in assembly about an element of mechanism, a lock or the like which is apt to be the subject of tampering and which means can be removed only by breakage of at least one of the component parts so that the absence thereof from the object to which it was attached indicates that tampering activity had occurred.

Another object of the invention is to provide a device in which the foregoing objective is obtained and which is adapted for application to the coupling means by which the opposite ends of a motor vehicle speedometer shaft are connected to the transmission or other driving means and to the speedometer mechanism itself.

A further object of the invention is to provide a drive of the foregoing character in which the first stated objective of the invention is achieved and which is attachable about a locking device with resultant covering of the keyhole of the locking device.

Still another object of the invention is to provide a device in which all of the foregoing objectives are realized in practice, which is formed of a plurality of identical parts, in which the component parts are of simple design and economical to manufacture, and which are readily applied to the device or mechanism to be protected and are incapable of being removed therefrom without breakage of those parts.

With the foregoing objects in view, together with such additional objects and advantages as may subsequently appear, the invention resides in the parts, and in the construction, combination and arrangement of parts described, by way of example, in the following specification of certain presently preferred embodiments of the invention, reference being had to the accompanying drawings which form a part of said specification and in which drawings:

FIG. 1 is a perspective view of a speedometer cable or driving shaft and the driving and driven connections thereof and having separate devices embodying the present invention applied to the said driving and driven connections.

FIG. 2 is an enlarged scale, exploded, perspective view of the component parts of the devices shown in FIG. 1 prior to assembly, FIG. 3 is an enlarged scale, sectional view of the assembled device as taken on the line 3—3 of FIG. 1, the speedometer shaft being omitted for clearness of illustration of the invention, and FIG. 4 is a perspective view of an embodiment of the invention applied to a lock.

Referring to the drawings, FIG. 1 shows the mileage indicating mechanism M of a speedometer operatively connected by detachable means to one end of a flexible shaft S by means including a nut N1, the other end of the shaft being connected to a driving mechanism associated with the transmission of a motor vehicle by other means including a nut N2. The present invention proposes the fitting of a box-like cover or shell about each of the nuts N1 and N2 by a means which prevents access thereto without removal and in which removal of the said cover or shell involves breakage of at least one component part of the cover means in such a manner that the cover means cannot be restored, wherefore, the absence of said cover or shell indicates that the connection of the shaft at one end or the other has been tampered with.

The illustrated embodiment of the portion of the invention for this purpose comprises two identical parts generally indicated by the numeral 1 wherefore, a description of one of them will serve for both up to the point of describing the cooperative interaction between a pair of such parts. The parts are preferably molded from a thin walled, brittle, but slightly resilient plastic material and each part comprises a box-like body portion 2 of about one-half the depth of the length and breadth, here shown as being at least substantially equal and said body portion including, what will be designated for convenience, the end wall 3, side walls 4 and 5, a tongue carrying wall 6 and a tongue engaging wall 7. The side walls 4 and 5 at the centers thereof are provided with semicircular cutout portions 8 and 9 of a diameter which will fit loosely over the portion of the speedometer shaft connection means at the opposite ends of the nuts N1 and N2 but which are of lesser diameter than the outer diameter of the nuts. When two of the parts are locked together as shown in FIGS. 1 and 3, these cutout portions form circular openings surrounding the shaft connecting means at each end of the connecting nut means as best shown in FIGS. 1 and 3. It will be understood that to accommodate the speedometer drive means in different makes of vehicles these cutout portions as well as the dimension of the box-like portion of the device may be of different sizes and that the said cutout portions may be different in the opposite walls.

The tongue carrying wall 6 includes a forwardly projecting tongue element 10 of a width to fit the inner dimensions between the walls 4 and 5 of the complementary body 2 and has an outer dimension to fit closely against the inner face of the wall 7 of said complementary body portion, and as best shown in FIG. 3, the wall 7 is preferably suitably thinned to afford clearance for the tongue element as compared with the thickness of the wall 6. The end wall 3 at the juncture with the wall 7 is provided with a narrow slot 11 of a length equal to the width of the tongue element 10 and a width only slightly greater than the thickness of the said tongue element. The free end of the tongue element is provided with a transverse spur or ledge portion 12 at the side thereof facing the interior of the body and said ledge is provided with a sloping entrant surface 13 and a locking face 14 facing the cavity of the body member and disposed on said tongue element at a distance from the shoulder 15 which engages the end face 16 of the complementary body which is equal to the distance from said end face 16 to the outer surface of the wall 3, the combined thickness of the tongue and ledge being slightly greater than the width of the slot 11.

In use, a pair of the body members are disposed at opposite sides of the shaft connection to be protected with the ends of the tongue elements 10 engaging the tongue receiving slots 11 and are pressed toward each other forcing the tongue elements through the opposing slots until the ledges 14 of the tongue elements engage the outer surfaces of the opposite body portions, the material having sufficient resilience to permit this momentary distortion incident to the spur elements being forced through the slots 11 without, however, fracturing the material. This locks the device loosely about the connecting nut and the only way subsequent access can be had thereto is by removing the device and this cannot be accomplished without breakage of either or both body components, wherefore, the unexplained absence of the device is indication that unauthorized access to the shaft connections has occurred.

Referring finally to FIG. 4, another embodiment of the invention is shown as applied to a lock, a padlock P being shown. In this embodiment, identical halves 20, 20 are provided to form a cavity in which the body of the lock is received, the ring or bar of the lock projecting through an opening 21 formed by identical cutout portions in one end wall portion of the said halves 20, 20 and the halves being locked together by tongue and slot means 22 and 23 at diagonally opposite corners, the tongue and slot devices being like those already described. Since the keyhole for the lock may be either at the end or at a side face, the body members thus locked together cover up the keyhole of the lock and as in the first embodiment of the invention, the absence of this cover means from a lock to which it had been applied is evidence that tampering has occurred.

From this disclosure it will also be apparent that the body members 20, 20 can be formed of a sufficient size and configuration to enclose a doorknob having a key-operated lock at the center thereof, the opening corresponding to the opening 21 in such case being circular so that the absence of such a covering from the doorknob would indicate the fact of unauthorized entry. Such a means would be useful to institutions such as hotels and motels in which the presence of this device over the knob of the door of a room assigned to a guest is a guarantee that the room has been prepared for occupancy and has not been occupied since that preparation was completed.

The foregoing specification has dealt with that aspect of the invention which contemplates that all of the interengaging parts forming the enclosure of the mechanical elements to be protected are equally frangible. It is believed to be obvious that where desired, the parts could be made thus interengaging but with less than all of the parts sufficiently frangible to be broken incident to attempted access to the connection protected thereby. It is sufficient if any one part be thus broken so long as such breakage will prevent restoration of the protecting means without replacement of the broken part. This may be achieved, for example, by making the end wall 3 of one of the parts constituting the first embodiment of the invention thinner than the corresponding wall of the other part or any other corresponding weakening of a portion of one of the two parts which will insure that breakage of that part will occur before breakage of the other part occurs. Preferably, for the sake of manufacturing economy, it is preferable to make the parts of uniform strength so that either or both may be destroyed when they are separated for access to the parts enclosed and protected thereby.

While in the foregoing specification there has been disclosed certain presently preferred embodiments of the invention, such disclosure has been by way of example and accordingly, it will be understood that the invention includes, as well, all such changes and modifications in the parts and in the construction, combination and arrangement of parts as shall come within the purview of the appended claims.

We claim:

1. A seal means constructed of frangible plastic material adapted to enclose a mechanical means to prevent tampering therewith comprising, first and second similar body members each having a pair of side walls and a pair of continuing end walls, said side and end walls being enclosed by a back wall, and at least one of said side walls provided with a cut-away portion, a tongue means extending in the plane of and beyond one of said end walls, said tongue means including a locking means, said back wall having a slotted area slightly removed from the plane of the other of said end walls so that as said similar body members are brought into assembled relation to enclose the mechanical means the locking means pass through the slotted areas on each of said back walls.

2. A seal means as claimed in claim 1, wherein the transverse extent of the tongue means is less than the width of said side walls.

3. A seal means as claimed in claim 1, wherein the tongue means has a thickness not greater than one-half the thickness of the end wall.

4. A seal means as claimed in claim 1, wherein the tongue means includes front and back surfaces, said front surface of a tongue means being substantially contiguous with the inner end wall surface of a mating body member.

5. A seal means constructed of frangible plastic material comprising two complemental body members each having a pair of side walls and a pair of end walls, said side and end walls each being enclosed by a back wall, at least one of said side walls being provided with a cut-away portion, said body members being matable to enclose a mechanical means to prevent tampering therewith with each end wall of one body member opposing an end wall of the other body member, one of each pair of opposing end walls having tongue means extending in the plane thereof and therebeyond, said tongue means each including a headed locking means, a slot in the area of a back wall corresponding to the end of each tongue means, said slots each being slightly removed from the plane of an adjacent end wall and being of a size smaller than the corresponding locking means, so that as said body members are brought into mating relation to enclose the mechanical means, the locking means pass through slotted areas of the respective back wall.

References Cited by the Examiner

UNITED STATES PATENTS

| 858,264 | 6/1907 | Daugherty | 292—307 |
| 2,519,828 | 8/1950 | Earnest | 292—307 X |
| 3,112,148 | 11/1963 | Wochner | 339—246 X |

FOREIGN PATENTS

| 542,386 | 1/1932 | Germany. |
| 854,784 | 11/1960 | Great Britain. |

MARVIN A. CHAMPION, *Primary Examiner.*

RICHARD E. MOORE, *Examiner.*